Figures 7, 8:
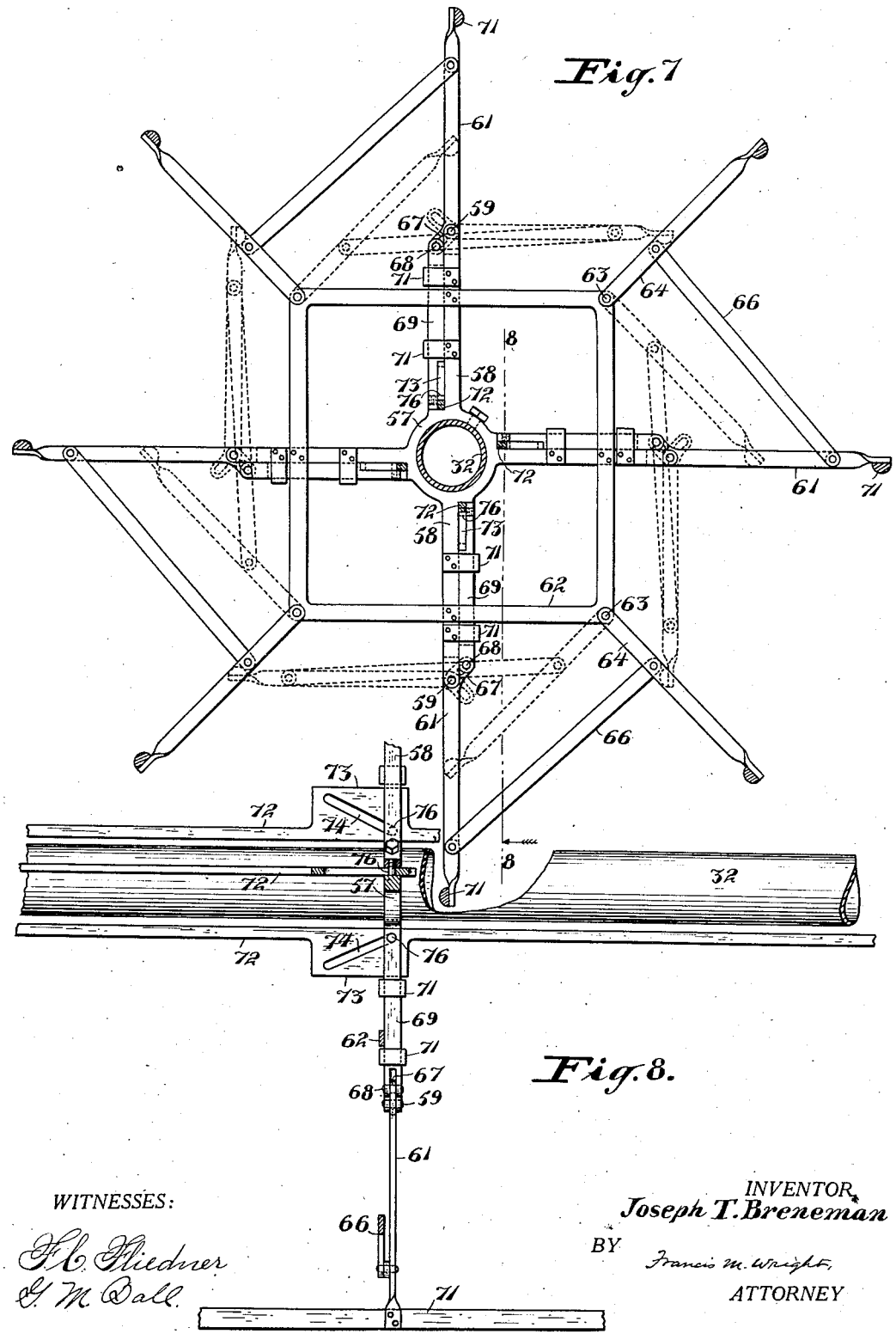

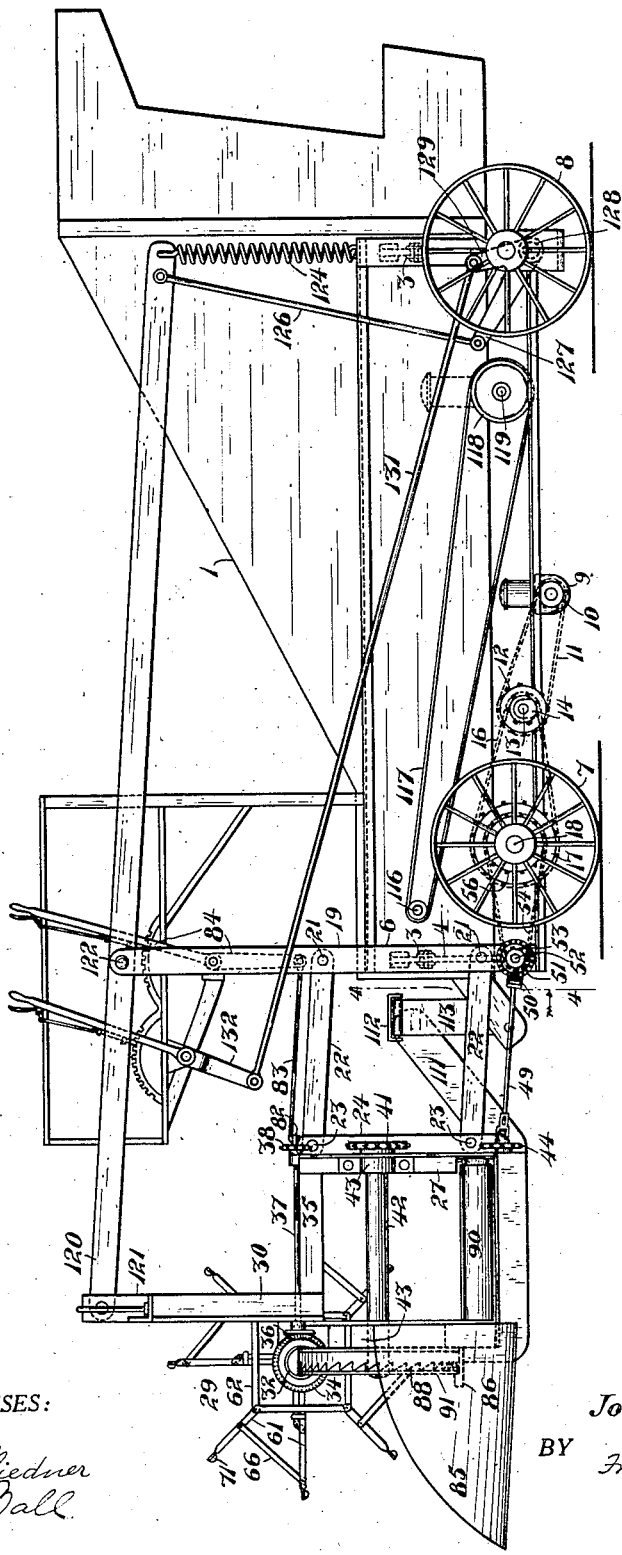

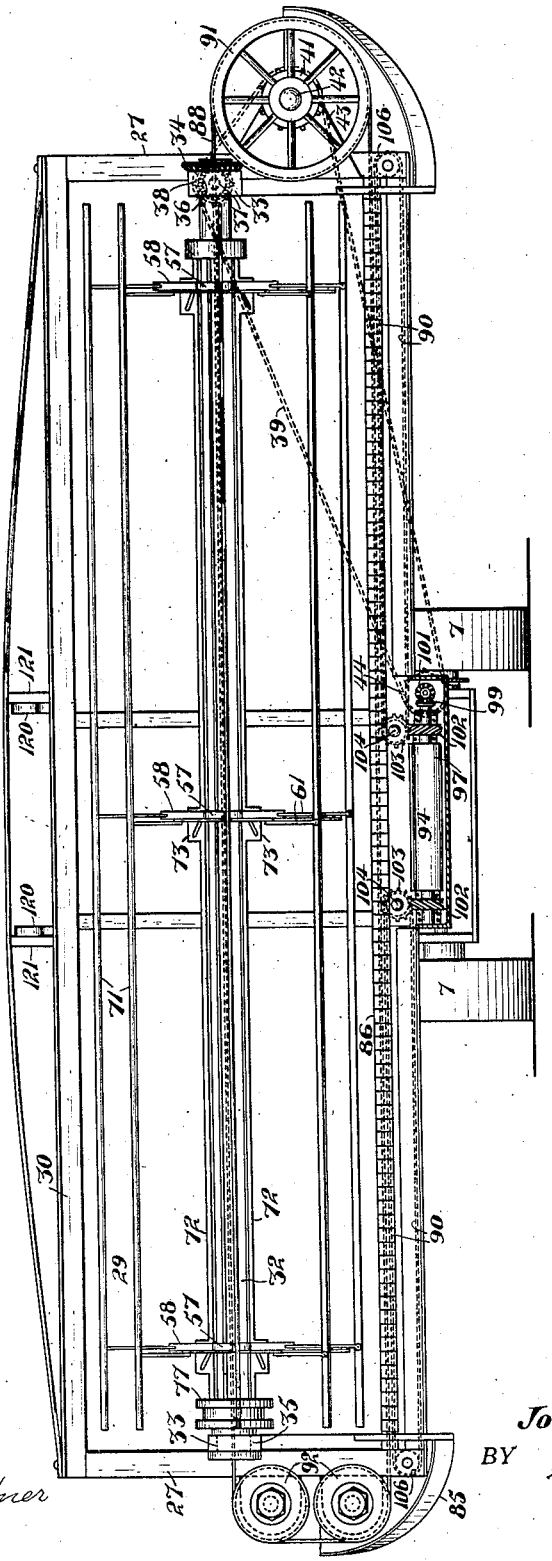

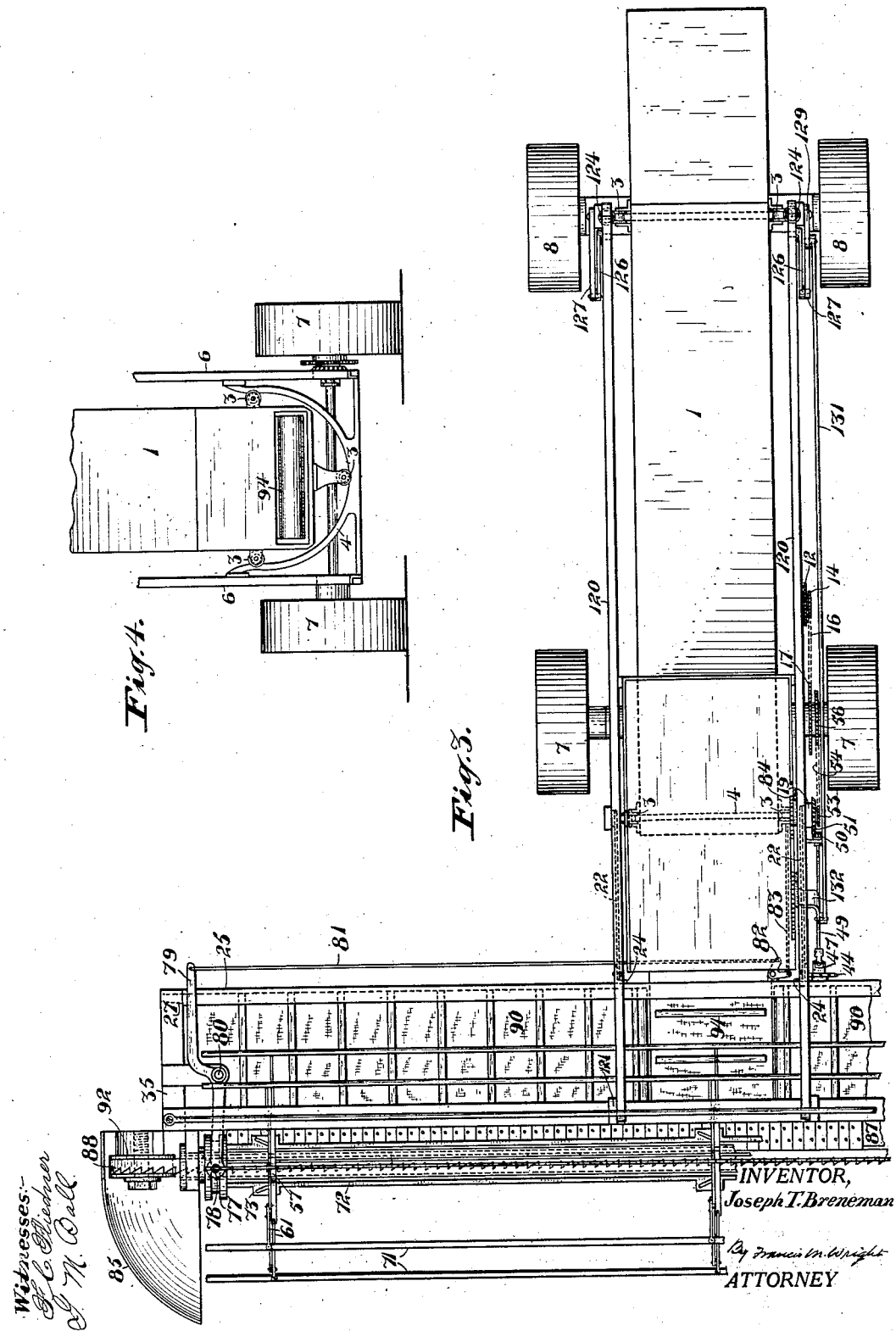

J. T. BRENEMAN.
COMBINED HARVESTER.
APPLICATION FILED AUG. 11, 1914.
1,269,522.
Patented June 11, 1918.
5 SHEETS—SHEET 4.
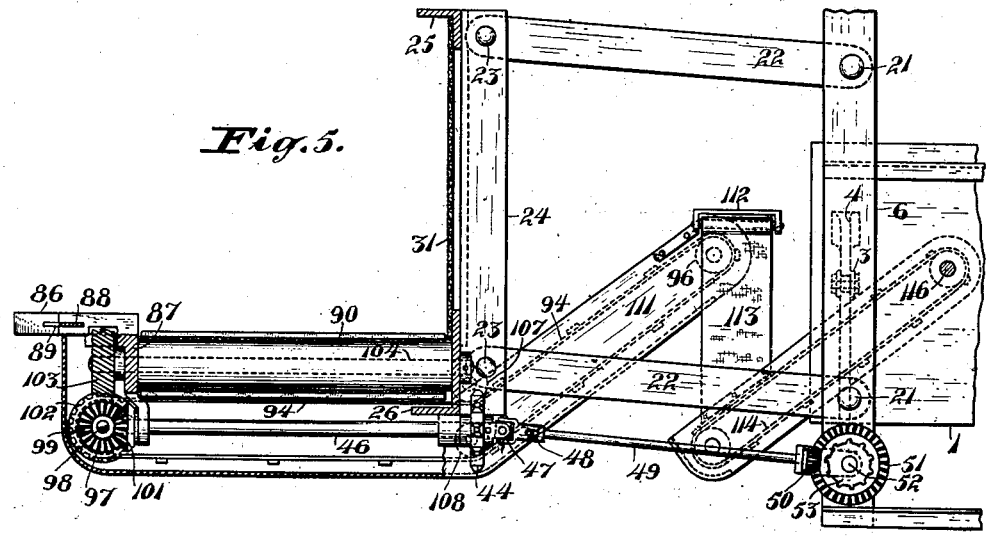
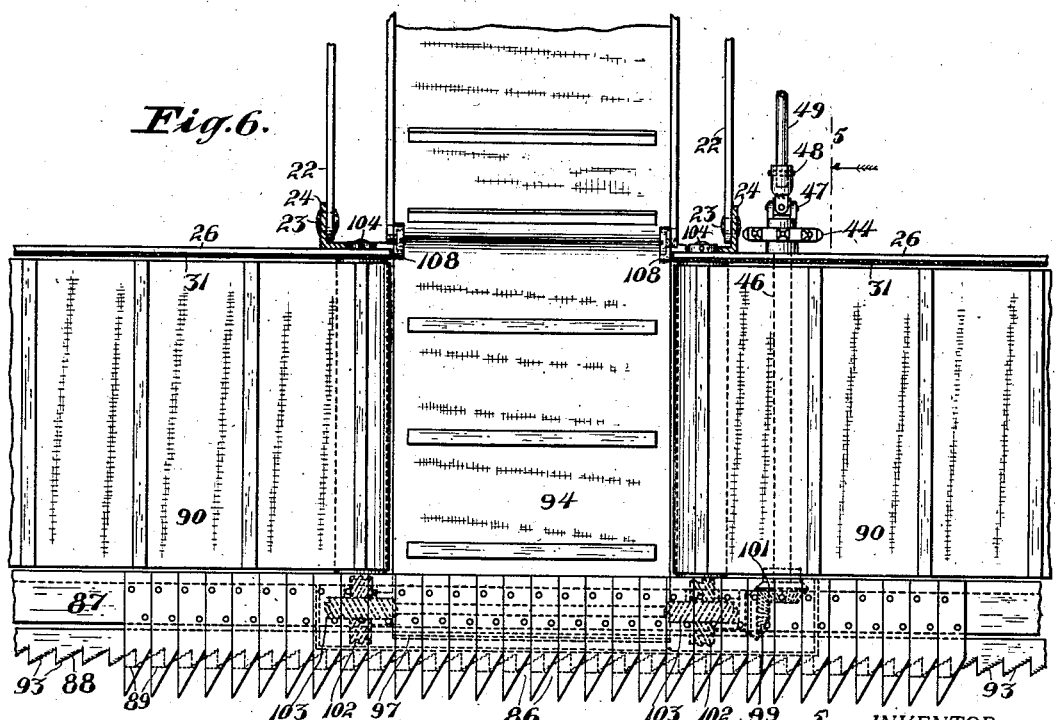
WITNESSES:
F. C. Gliedner
G. M. Ball
INVENTOR,
Joseph T. Breneman
BY Francis M. Wright,
ATTORNEY

J. T. BRENEMAN.
COMBINED HARVESTER.
APPLICATION FILED AUG. 11, 1914.

1,269,522.

Patented June 11, 1918.
5 SHEETS—SHEET 5.

WITNESSES:

INVENTOR,
Joseph T. Breneman
BY
ATTORNEY

UNITED STATES PATENT OFFICE.

JOSEPH T. BRENEMAN, OF RUST, CALIFORNIA.

COMBINED HARVESTER.

1,269,522.  Specification of Letters Patent.  Patented June 11, 1918.

Application filed August 11, 1914. Serial No. 856,234.

*To all whom it may concern:*

Be it known that I, JOSEPH T. BRENEMAN, a citizen of the United States, residing at Rust, in the county of Contra Costa and State of California, have invented new and useful Improvements in Combined Harvesters, of which the following is a specification.

The present invention relates to improvements in harvesters. One object of the invention is to provide a harvester which will operate equally well on the sides of hills as on level ground. A further object is to provide a harvester which will cut off the heads of grain with a minimum jar, noise and friction, and will therefore be extremely efficient and durable. A further object is to provide means for cutting off said heads and gathering them into the harvester the distance of which from the ground can be adjusted and in which the reel can be expanded or contracted as desired. Further advantages attendant upon my improved harvester will appear from the description thereof and will be particularly pointed out in the claims.

In the accompanying drawing, Figure 1 is a side view of the harvester; Fig. 2 is a broken front view thereof; Fig. 3 is a broken plan view; Fig. 4 is a vertical section on the line 4—4 of Fig. 1; Fig. 5 is a vertical section on the line 5—5 of Fig. 6; Fig. 6 is an enlarged plan view, showing particularly the carriers; Fig. 7 is an enlarged transverse vertical section of the reel; Fig. 8 is a vertical section on the line 8—8 of Fig. 7.

Referring to the drawing, 1 indicates the main body of the harvester, in plan view substantially rectangular in form, and, as clearly shown in Figs. 1, 3 and 4, supported upon rollers 3 on circular vertical tracks 4, supported by frames 6, which are themselves supported upon front wheels 7 and rear wheels 8. This arrangement permits of the harvester maintaining a horizontal position, notwithstanding any inequality of level of the wheels on its opposite sides. The front wheels are driven by means of a motor 9 around a sprocket wheel 10 on the shaft of which is a sprocket chain 11 which travels around a sprocket wheel 12 on a countershaft 13 carrying a sprocket wheel 14 around which is a sprocket chain 16, which also travels around a sprocket wheel 17 on the front wheel axle 18.

Upon the front portion of the frame are secured vertical bars or posts 19, to which are pivotally attached, as shown at 21, ends of equal parallel links 22, the other ends of which are pivotally attached, as shown at 23, to vertical angle-irons 24. To the ends of said vertical angle-irons are secured upper and lower equal transverse angle-irons 25, 26, (Fig. 5). The ends of these angle-irons 25, 26, are connected to the ends of vertical side pieces 27. There is thus formed a frame for supporting a reel frame 30. Secured to said vertical side pieces 27 and to the transverse angle-irons 25 and 26, and closing the opening between them, is a sheet 31 of canvas or other suitable material. 33 indicates bearings for the hollow shaft 32 of a reel 29, said bearings being supported upon end frames 35 extending longitudinally forward from the vertical side pieces 27, and said shaft being rotated by a bevel gear 34 mounted on one end thereof, and meshing with a bevel pinion 36, upon a shaft 37, carrying a sprocket wheel 38, rotated by means of a sprocket chain 39, (Fig. 2) passing around a sprocket wheel 41 on a shaft 42 having a bearing in an extension frame 43, and said chain also passing around a sprocket wheel 44 (Fig. 5) on a shaft 46 slidably connected by a slotted knuckle joint 47 and pin 48 to a shaft 49 carrying a bevel pinion 50 driven by a bevel gear 51 on a shaft 52 carrying a sprocket wheel 53, around which travels a sprocket chain 54 traveling also around a sprocket wheel 56 upon the axle 18. By this means the reel shaft constantly rotates with the motion of the harvester.

Secured on said shaft at its middle and near its ends are collars 57, from which radially extend bars 58 (Figs. 7, 8) to the outer ends of which bars are pivoted, as shown at 59, arms 61. To said bars 58 are secured sides of a square frame 62, to the corners of which are pivoted, as shown at 63, arms 64 which are pivotally connected to the ends of links 66, the other ends of which are pivotally connected to the arms 61. The arms 61 have rearward slotted extensions 67, and in the slots of said extensions can slide pins 68, secured on the ends of slide bars 69, slidable in guides 71. Said rearward extensions 67 extend at an angle with the arms 61, so that, when the slide bars 69 are slid outwardly, the effect is to swing all of said arms 61 through an angle proportionate to the extent of movement of the slide bars 69. In Fig. 7 the dotted lines indicate the innermost positions of said arms 61. In these positions it will be observed that the arms 64 have also been swung inwardly, so that their outer ends are at substantially the same distance from the center of the reel as the outer ends of the arms 61, this movement being effected by reason of the link connection between the arms 61 and 64. To the ends of the arms 61 and 64 are secured longitudinal rods 71 thus forming the reel 29.

To effect the sliding movement of said slide bars 69, there are provided, around the reel shaft 32 and parallel therewith, four straight rods 72, formed integral with a plate 73 for each collar 57, in which plates are oblique slots 74, in which are contained pins 76 carried by the slide bars 69. It will be obvious that, if said plates are moved in a direction parallel with the shaft, the slide bars 69 will be moved in a direction extending radially of the shaft. By means of this contrivance, therefore, the reel can be extended or contracted. One end of each rod 72 is secured to a grooved collar 77 in which is a roller 78, carried by an end of a lever 79, pivoted at 80, the other end of which lever is attached to a rod 81, which is also attached to a bell crank lever 82, which is also connected to one end of a rod 83, the other end of which is connected to a hand lever 84 under the control of the operator, so that, by operating said hand lever, the reel can be contracted or expanded as desired.

The stalks of grain standing in the path of the harvester and between two shields 85 are drawn down by means of the reel against a distributer 86 (Figs. 3, 5, 6) consisting of guard fingers secured to a transverse frame 87, one edge of each guard finger being straight and at right angles to said frame, or extending longitudinally of the machine, and the front portion of the other edge being oblique thereto. These guard fingers thus form uniform pockets to receive the stalks of grain and distribute said stalks among said pockets. The stalks of grain, having been drawn by the reel into the pockets, are cut off by a band saw 88, (Figs. 1, 2, 5, 6,) which travels in slots or guides 89 in the guard fingers, being moved by a working pulley 91 on the shaft 42 and then traveling through the hollow shaft 32 and about idle pulleys 92. The cutting edges 93 of the teeth of the band saw are corrugated, as shown, and the ends of the slots in the straight faces of the guard fingers furnish additional cutting edges for cutting the stalks of grain. These stalks fall upon side drapers 90 and a central draper 94. The central draper travels around an idle roller 96, and a working roller 97 on a shaft 98 carrying at one end a bevel gear 99, which meshes with a bevel gear 101 on the shaft 46, said shaft 98 carrying near its ends worms 102 which mesh with worm wheels 103 on working shafts 104 which move the side drapers, said side drapers moving also around idle rollers 106. Said central draper moves beneath upper and lower idle wheels 107, 108, and around the idle roller 96 mounted in side pieces 111, to which are secured frames 112, carrying the upper ends of aprons 113, which confine the stalks of grain so that they fall upon a second draper 114, moved by a working shaft 116, which is rotated by a belt 117 from a pulley 118 on a motor shaft 119. It will be remembered that the main body 1 of the harvester retains its horizontal position, notwithstanding varying inclinations of the surface of the ground over which the wheels are traveling, while the posts 19, and the parts supported thereby, such as the reel frame 30, the drapers 90 and 94, and the side pieces 111 follow in their inclinations the slope of the ground. These aprons 113, therefore, the lower ends of which are secured to the frame of the draper 114, are of importance, because they prevent the heads of grain falling out while being transferred from the draper 94 suspended from the posts 19 to the draper 114 supported on the main body 1.

In order to vary the distance from the ground of the reel and of the band saw, the reel frame is suspended by bars 121 from the ends of levers 120, pivoted at 122 upon the upper ends of the posts 19, the other ends of said levers being secured to the upper ends of coiled springs 124, the lower ends of which are secured to the body 1, and said latter ends being also secured to links 126, which are also secured to rocking arms 127 on a transverse shaft 128, to one end of which is secured a crank arm 129, to which is pivoted one end of a link 131, the other end of which is pivoted to a hand lever 132. By suitably moving said hand lever the whole frame 29 can be moved vertically to vary the distance, as desired, of the reel, band saw, and guide therefor from the ground.

The cut stalks of grain are, by means of the draper, carried to the harvester to be treated in the usual manner.

I claim:—

1. In a grain header, a hollow rotary reel shaft, a reel secured thereto, and a band saw, movable so that one portion passes through said hollow shaft, and another portion is outside of, and below, said reel.

2. In a grain header, a hollow rotary reel shaft, a reel secured thereto, a band saw, and guard fingers provided with guiding means therefor, said band saw being movable in one direction through said hollow shaft and in the other direction through said guiding means.

3. In a grain header, a hollow rotary reel shaft, a reel secured thereto, a band saw, guard fingers below the reel shaft having guiding means for the band saw, a driving wheel half-way around which the band saw travels at one end, and idler wheels at its other end, one portion of the band saw being within said hollow shaft and an opposite portion extending through said guiding means.

4. In a harvester, a reel comprising a shaft, bars secured to and extending radially from said shaft, a frame secured to said bars, arms pivoted to ends of said bars and having angular extensions, means connected to said extensions for moving said arms, arms pivoted to said frame, links connecting said latter arms with the first-named arms, and longitudinal rods connecting the ends of said arms.

5. In a harvester, a reel comprising a shaft, bars secured to and extending radially from said shaft, a frame secured to said bars, arms pivoted to ends of said bars and having angular extensions, slotted plates slidable parallel with said shaft, guides on said bars, slide pieces slidable in said guides and having pins entering said slots, the outer ends of said slide pieces being pivoted to said extensions, means connected to said extensions for moving said arms, arms pivoted to said frame, links connecting said latter arms with the first-named arms, and longitudinal rods connecting the ends of said arms.

In testimony whereof I have hereunto set my hand in the presence of two subscribing witnesses.

JOSEPH T. BRENEMAN.

Witnesses:
F. M. WRIGHT,
D. B. RICHARDS.